United States Patent [19]

Mangus

[11] 4,069,101
[45] Jan. 17, 1978

[54] SELF-COMPENSATING LEVEL CONTROL FOR SUMP SUCTION PUMPS

[75] Inventor: James D. Mangus, Greensburg, Pa.

[73] Assignee: Westinghouse Electric Corporation, Pittsburgh, Pa.

[21] Appl. No.: 478,128

[22] Filed: June 10, 1974

[51] Int. Cl.² .............................................. G21C 19/28
[52] U.S. Cl. ...................................... 176/65; 176/40; 165/107
[58] Field of Search ...................... 176/40, 65; 165/107

[56] References Cited

U.S. PATENT DOCUMENTS

| | | | |
|---|---|---|---|
| 2,971,746 | 2/1961 | Bell | 165/107 X |
| 3,309,282 | 3/1967 | Maldague | 176/65 |
| 3,504,737 | 4/1970 | Charcharos et al. | 165/107 |
| 3,624,759 | 11/1971 | Carlson | 176/65 X |
| 3,651,866 | 3/1972 | Lileg et al. | 165/107 |
| 3,793,143 | 2/1974 | Muller | 176/65 |
| 3,859,166 | 1/1975 | Flynn et al. | 176/65 X |

*Primary Examiner*—Peter A. Nelson
*Attorney, Agent, or Firm*—Edward L. Levine; Z. L. Dermer

[57] ABSTRACT

Apparatus as disclosed for eliminating drawdown of the level of liquid in a sump suction type of pump having a cover gas above the liquid therein. The liquid level is maintained throughout all pump operating speeds and without the need to vary the cover gas pressure of the pump. The pump includes a divider plate which separates the sump tank into upper and lower chambers. When the speed of the pump increases, the divider plate serves to limit the amount of liquid flowing therepast. An orifice flow tube connects the pump outlet to the upper chamber of the sump tank. Thus, the leakage flow past the divider plate is pumped back into the upper chamber thereby automatically compensating for the effect of pump drawdown.

4 Claims, 4 Drawing Figures

SELF-COMPENSATING LEVEL CONTROL FOR SUMP SUCTION PUMPS

CROSS REFERENCE TO RELATED APPLICATIONS

This application relates to the following applications: ERDA, Ser. No. 606,043 entitled "A Pump Tank Divider Plate For Sump Suction Pumps" by J. A. George, filed Aug. 20, 1975; and application Ser. No. 468,778, entitled "Nuclear Reactor Cooling and Cover Gas System" by J. A. George, et al, filed May 10, 1974, and assigned to the Westinghouse Electric Corporation.

BACKGROUND OF THE INVENTION

1. Field of the Invention

This invention relates generally to sump suction pumps and more particularly to this type of pump as utilized with a liquid metal cooled nuclear reactor.

2. Description of the Prior Art

A nuclear reactor produces heat by fissioning of nuclear materials which are fabricated into fuel elements and are assembled within a nuclear core. In commercial nuclear reactors, the heat produced thereby is used to generate electricity. Such nuclear reactors usually comprise one or more primary flow systems and a corresponding number of secondary flow systems to which conventional large steam turbines and electrical generators are coupled. Thus, a typical energy conversion process for commercial nuclear reactors involves transfer of heat from the nuclear core to a primary coolant flow system then to a secondary coolant flow system and finally into steam from which electricity is generated.

In a liquid cooled nuclear reactor, such as a liquid metal cooled breeder reactor, a reactor coolant such as liquid sodium, is circulated through the primary coolant flow system. Typically, the primary system comprises a nuclear core within a reactor vessel, a heat exchanger, a circulating pump and piping interconnecting the aforementioned apparatus. In nuclear reactors having more than one primary system, the nuclear core and the reactor vessel are common to each of the primary systems.

The heat generated by the nuclear core is removed by the reactor coolant which flows into the reactor vessel and through the nuclear core. The heated reactor coolant exits from the reactor vessel and then flows to the heat exchanger where the heat previously acquired is transferred to the secondary flow system associated therewith. The cooled reactor coolant exits from the heat exchanger and flows to the pump which again circulates the coolant into the pressure vessel repeating the described flow cycle.

The circulating pump utilized with the above-described primary coolant flow system is classified, in the nuclear art as a "cold leg" pump. This is because the pump is located downstream of the heat exchanger where the reactor coolant is relatively cool. In comparison, a "hot leg" pump is one which is located immediately downstream of the reactor vessel where the reactor coolant is relatively hot. Thus, a cold leg pump operates within a cooler and hence, less hostile environment. From a design standpoint, the cold leg pump is therefore more desirable. However, because of a phenomenon known as "drawdown", a cold leg pump relinquishes some of its advantages.

Drawdown refers to the change in liquid level of the liquid in a sump suction pump when the pump increases its speed from zero to full operating conditions. The amount of change of liquid level is equal to the friction head loss, in feet, between the reactor vessel outlet and the pump inlet. Since the friction head loss is much greater in a cold leg pump than in a hot leg pump, the liquid level change, or drawdown, is much greater in the former than the latter type of pump. The effect of pump drawdown is reflected in the length of the drive shaft connecting the pump impeller to the pump motor. For purposes of comparison, in one liquid metal system, the required length of the pump shaft is 12 feet for a hot leg pump and 36 feet for a cold leg pump. It is readily understandable therefore, that recent prior art have disclosed apparatus whereby the pump drawdown in a cold leg pump is minimized or eliminated completely. One such example of this prior art is found in the afore-referenced ERDA patent application.

The sump suction pump in the ERDA patent application is provided with a divider plate which divides the pump sump tank into an upper and a lower chamber. The pump impeller as well as the pump inlet nozzle and the pump outlet nozzle are located within the lower chamber. The chamber above the divider plate is partially filled with a reactor coolant and includes a cover gas above the level of coolant therein. The sump tank is sealed at its upper end by a cover plate. The pump motor is mounted on top of the cover plate. A drive shaft extends from the pump motor through the cover plate and into the sump tank where it is attached to the impeller below the divider plate. In this manner, the pump motor is protected against the corrosive effects of the liquid metal reactor coolant.

In operation, the divider plate allows a small amount of reactor coolant to leak from the upper chamber into the lower chamber of the sump tank. Therefore, when the pump increases its operating speed, the usual drawdown effect is limited to the level change as allowed by the leakage past the divider plate. This permits time for the pump cover gas pressure to be lowered to maintain an essentially constant level of liquid in the sump tank.

To illustrate the principle involved in the referenced application, assume a representative system friction loss from the reactor vessel outlet to the pump inlet of 15 psi at full coolant flow. Further, assume the cover gas pressure above the constant free surface level in the reactor vessel is maintained at 18 psig throughout the operating range. The cover gas pressure above the free surface level in the pump sump tank is separately controlled to maintain a constant level. At zero flow conditions, the level in the reactor vessel will be equal to the level in the pump sump tank and both cover gas systems will be at the same pressure of 18 psig. As flow is increased, the level of coolant in the pump sump tank will begin to fall. However, the divider plate will limit the rate of drawdown and allow time for the cover gas pressure in the pump sump tank to be readjusted and maintain a constant level. At full flow conditions, both free surface levels will still be equal. The gas pressure in the reactor vessel will remain constant at 18 psig but the pressure in the pump sump tank will be close to atmospheric at 3 psig.

This recent prior art has significantly advanced the state of the art of cold leg pumps for use with liquid metal cooled nuclear reactors. However, this is not to imply that the recently disclosed art is not without its difficulties. For example, as explained above two separate cover gas control systems, operating in parallel, are required to maintain the free surface levels of reactor coolant in the reactor vessel and in the sump tank. Thus, there exist a continuing need for improvements in the art of sump suction pumps.

SUMMARY OF THE INVENTION

The aforementioned difficulties of the prior art are overcome by the present invention which provides apparatus for maintaining constant the level of coolant in a sump suction pump of the type utilizing a divider plate. Further, the present invention accomplishes this without the need for separate cover gas control systems.

An orificed flow passage is provided between an outlet manifold of the pump, within the sump tank, to the upper chamber of the sump tank. In one embodiment, the orifice flow connection is sized to flow reactor coolant from the pump outlet back into the pump upper chamber at a rate equal to the leakage of reactor coolant past the divider plate when the pump increases its speed from zero flow to full flow conditions. In another embodiment, a variable orifice is provided within the flow connection between the sump tank chambers so that changes occurring within the system over the lifetime of the nuclear reactor are compensated for automatically.

DESCRIPTION OF THE PREFERRED EMBODIMENTS

Throughout the description which follows, like characters indicate like elements of the various figures of the drawings.

Figure 1:
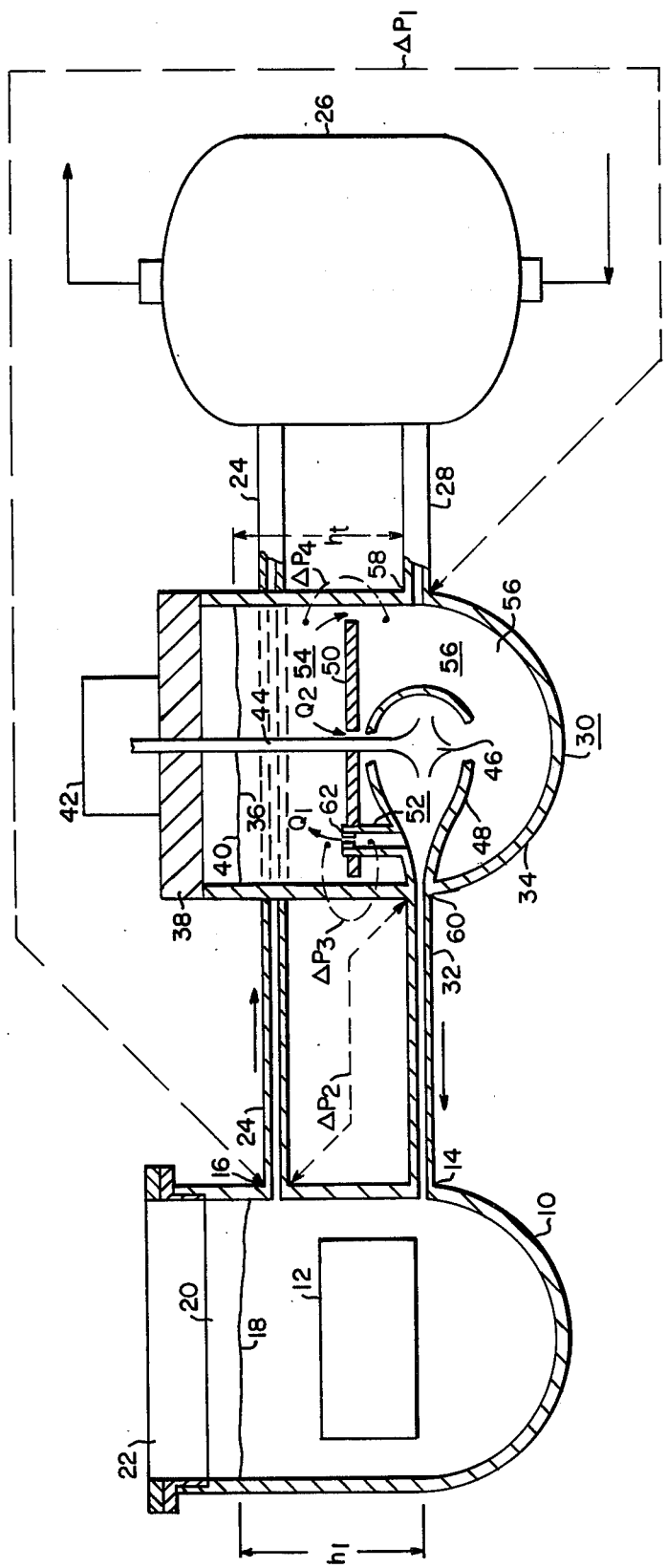
FIG. 1 is a schematic of a primary coolant flow system of a nuclear reactor having a sump suction pump incorporating the principal features of this invention.

Referring now more particularly to FIG. 1 of the drawings, a primary system coolant flow loop of a liquid metal cooled nuclear reactor incorporating the principles of this invention is schematically illustrated therein. A sealed reactor vessel 10 houses a nuclear core 12 which contains fissile materials. Reactor vessel 10 includes primary coolant inlet and outlet nozzles, 14 and 16, respectively. Nozzles 14 and 16 provide for ingress and egress of reactor coolant through the vessel 10 and the nuclear core 12 contained therein. During reactor operation, the reactor vessel 12 is filled with a quantity of reactor coolant to the level indicated in the schematic and designated numeral 18. In the type of reactor considered herein, the reactor coolant comprises liquid sodium.

A blanket of inert gas 20 occupies the space within the reactor vessel 10 above the level of reactor coolant 18. Typically, the cover gas may consist of helium, nitrogen, argon, or some other like inert gas which does not adversely react with the reactor coolant or interfere with various aspects of reactor operation such as detection of leaks. A shield plug 22 is utilized to seal the reactor vessel and provide radiation shielding from radiation emitted from the nuclear core 12.

Upon passing through the nuclear core 12 and exiting from the reactor vessel 10 through primary coolant outlet nozzle 16, hot reactor coolant flows through a portion of interconnecting piping 24 and into a heat exchanger 26. Cooled reactor coolant exits from the heat exchanger 26, flows through another portion of interconnecting piping 28 and enters the inlet of a primary coolant circulating pump 30, which comprises a sump suction pump.

Circulating pump 30 pumps the cooled reactor coolant through still another section of interconnecting piping 32 and back into the reactor vessel 10 through inlet nozzle 14. The type of pump shown in FIG. 1 is classified as a cold leg pump in that it pumps cooled reactor coolant rather than hot reactor coolant.

Although FIG. 1 shows only one primary coolant flow system of a nuclear reactor, it will be appreciated by one skilled in the art that the invention is not to be thereby limited. The invention may be equally applied to each reactor coolant circulating pump of a reactor having any number of primary coolent flow systems in which the reactor vessel 10 is common to each.

As schematically shown in FIG. 1, circulating pump 30 includes a sump tank 34 which is partially filled with reactor coolant to a level 36. Pump tank 34 is appropriately capped and shielded by plug 38. A cover gas blanket 40 is utilized above the level 36 of reactor coolant within pump tank 34. The pump 30 is driven by a motor 42 which is located external of the pump tank 34. A pump shaft 44 extends from the motor 42, into the pump tank 34 to an impeller 46. Since circulating pump 30 is a sump suction pump, reactor coolant enters into the impeller 46 from the sump tank 34; and, the outlet of reactor coolant from the pump impeller 46 is through ducted manifold 48 which penetrates the wall of sump tank 34. A divider plate 50 extends across the substantially circular cross-sectional shape of sump tank 34 and is located above the pump impeller 46 but below the level 36 of reactor coolant therein. Thus, divider plate 50 is immersed within the reactor coolant within sump tank 34 and is positioned above the pump inlet and outlet nozzles. In this manner, divider plate 50 creates an upper chamber 54 and a lower chamber 56. Divider plate 50 fits closely within pump tank 34 and around pump shaft 44 so as to create a flow restriction to limit the flow of reactor coolant from the upper chamber 54 into the lower chamber 56 during change of pump speed.

An orificed tube assembly 52, as provided by this invention, is utilized to flow connect the outlet manifold 48 of pump impeller 46 to upper chamber 54. The function and operation of tube assembly 52 will be more fully described hereinafter.

Still referring to FIG. 1, $\Delta P_1$ is defined as the system pressure drop between the reactor vessel outlet 16 and the pump inlet 58. In other words, $\Delta P_1$ comprises the system pressure drop through interconnecting piping 24, heat exchanger 26 and interconnecting piping 28. $\Delta P_2$ is defined as the system pressure drop between the pump outlet 60 and the reactor vessel outlet 16; or, the pressure drop through interconnecting piping 32 and reactor vessel 10. Further, $h_1$ represents the static head of reactor coolant between the pump impeller 46 and the level 18 of reactor coolant in reactor vessel 10; and, $h_t$ is the state head of reactor coolant between the pump impeller 46 and the level 36 of coolant within sump tank 34. Within circulating pump 39, $\Delta P_3$ is the pressure drop across a flow restricting orifice 62, with a discharge coefficient $K_1$, which is located within tube assembly 52. The flow of reactor coolant from the pump outlet manifold 48 through tube assembly 52 and into the upper chamber 54 is represented by flow rate $Q_1$. Similarly, $\Delta P_4$ is the pressure drop across the divider plate 50 having a reactor coolant flow rate designated as $Q_2$ and having an effective flow coefficient of $K_2$. It has been shown that $Q_1 = Q_2$ and $h_1 = h_t$ providing $K_2{}^2\Delta P_1 = K_1{}^2\Delta P_2$. And, it has been shown that $\Delta P_1$ is proportional to $\Delta P_2$ for all pump speeds. Therefore, a fixed sodium level in the upper chamber 54 is able to be maintained by the use of a fixed orifice 62 between the pump discharge 48 and the upper chamber 54. By utilizing these equations and expressions, one skilled in the art can readily size orifice 62 so that level 36 of reactor coolant within pump tank 34 remains constant for all pump speeds and thereby substantially eliminate the phenomenon known as pump drawdown.

Since it may be somewhat difficult to predict in advance the values of $\Delta P_1$, $\Delta P_2$ and $K_2$ for a particular reactor system to an accuracy sufficient to predict the value of $K_1$, a means of adjusting the size of orifice 62 is advantageous. An adjustable orifice is additionally advantageous to negate the effects of change in the values of the various system pressure drops and coefficients which may occur during reactor lifetime due to plugging, erosion, and other like long-term system changes. There are also short-term changes brought on for example as a result of thermal expansions throughout the system. These effects can be compensated for by use of the expression:

$$h_1 = h_t = \frac{X^2 - 1}{X^2 + \frac{\Delta P_1}{\Delta P_2}}$$

where X is defined as the change in the effective flow coefficient $K_2$ of the flow $Q_2$ past the divider plate 50.

The following may serve as an example in aiding one skilled in the art to practice the invention. If it is assumed that $\Delta P_1 = 46$ feet and, $\Delta P_2 = 283$ feet, which are approximately the values before an actual liquid metal cooled demonstration nuclear reactor. And, if it is further assumed that a change of reactor coolant level 36 of $\pm 2$ feet within sump tank 34 is acceptable, then a change in the effective flow coefficient $K_2$ of $\pm 3\%$ is acceptable. Within these values of $K_2$ a fixed orifice 62 is adequate; however, if a change of greater than $\pm 3\%$ over the lifetime of the reactor occurs or to compensate for short-term effects, then an adjustable orifice 62 is more advantageous. Although not shown in the figure, it is readily envisionable that an adjustable orifice may be controlled by liquid level sensing devices which are separated by a predetermined distance and are attached to the sump tank 34. When the reactor coolant level 36 exceeds either of the limits set by level sensing devices, then the appropriate device would signal means connected to the orifice for adjusting its size. Indeed, such a self-compensating system may be advantageously used merely to eliminate any uncertainties associated with the calculations for a fixed orifice.

It is important to note that the orifice tube assembly 52 provided by this invention is not dependent upon maintaining a particular pressure of the cover gas 40 within circulating pump 30. Thus, the same pressure controlled system which is used to maintain the pressure of cover gas 20 within reactor vessel 10 may be used also to regulate the pressure of the cover gas 40 within the circulating pump 30.

Figure 2:
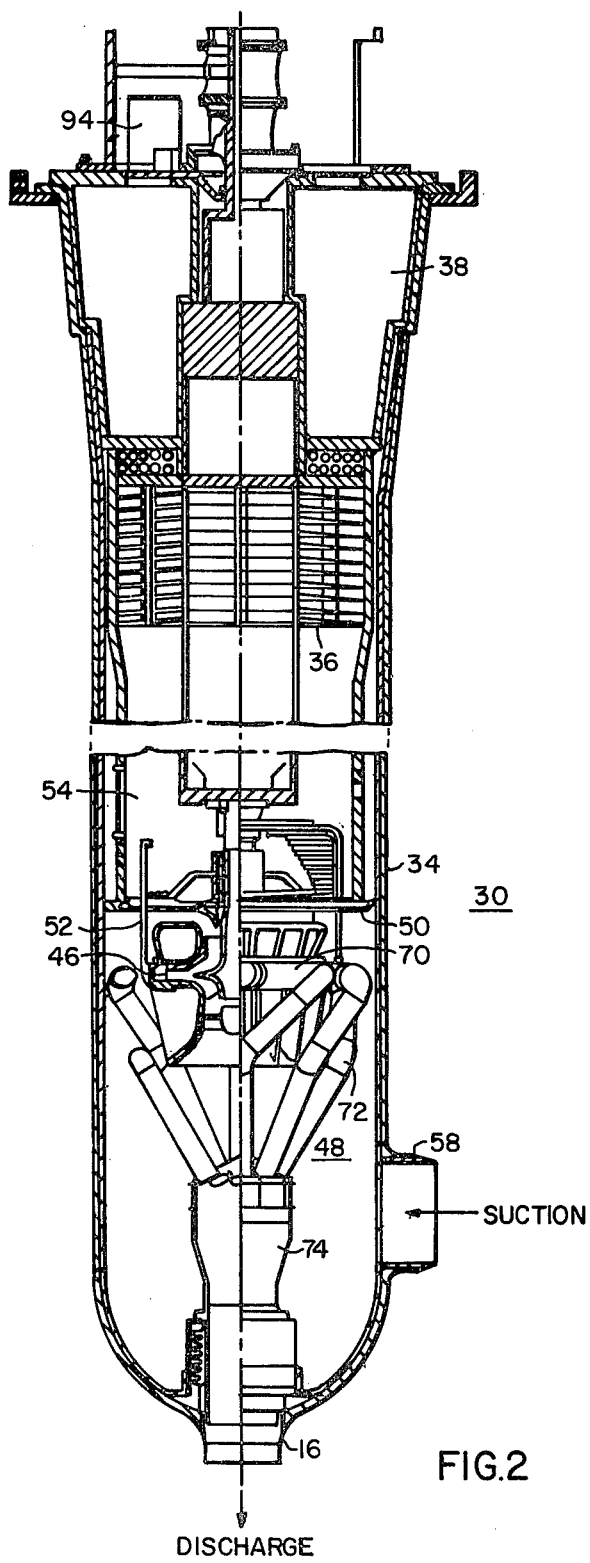
FIG. 2 is a detailed cross-sectional drawing of a sump suction pump as provided by this invention.

Details of a sump suction pump for use with a liquid metal cooled nuclear reactor are illustrated in FIG. 2. The outlet manifold 48 schematically illustrated in FIG. 1 can be seen in FIG. 2 to comprise a manifold 70 which encircles pump impeller 46, a plurality of discharge pipes 72, which are connected to the manifold 70, and an exit manifold 74 which connects the discharge pipes 72 to the outlet nozzle 16. The divider plate 50 is located slightly above pump impeller 46. The orifice flow tube assembly 52 is seen to connect manifold 70 to the pump upper chamber 54 above divider plate 50. Pump motor 42 which is mounted to plug 38 is not seen in this drawing. Orifice assembly 52 may be connected to manifold 70 by such means as welding. Connection of orifice assembly 62 to and through divider plate 50 may be accomplished by the use of a conventional sliding seal.

Figure 3:
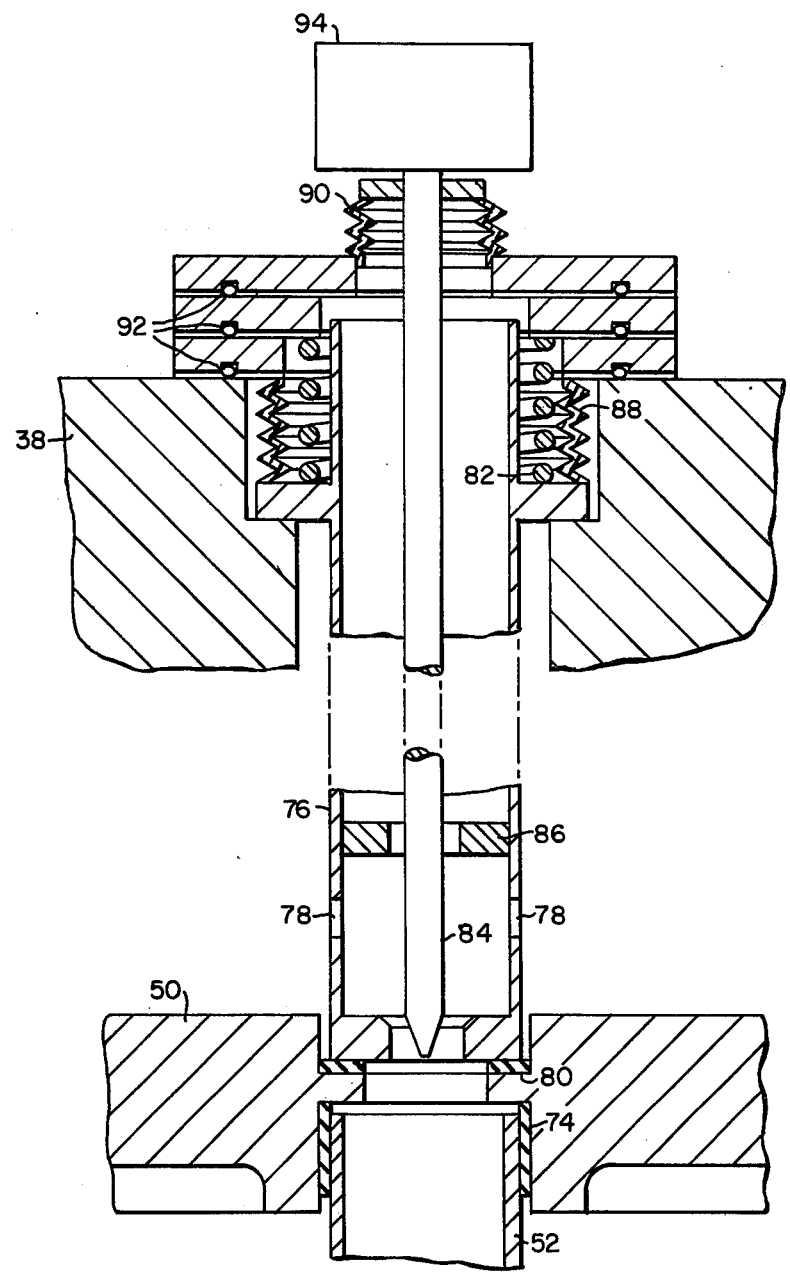
FIG. 3 is a simplified cross-sectional drawing of one version of a variable orifice for use with this invention; and, FIG. 4 illustrates a method of controlling the variable orifice of FIG. 3.

One version of an adjustable orifice is illustrated in FIG. 3. In this version, the orifice 62 is removed from tube assembly 52. Tube assembly 52 extends from the pump outlet manifold assembly 48 to divider plate 50. Tube 52 is slidingly received by divider plate 50 to compensate for differences in thermal expansion. A sliding seal 74 is provided at this connection. Another tube assembly 76 extends from the top of divider plate 50 through shield plug 38. Tube 76 contains orifice 62 at its lower end. Tube 76 and tube 52 are axially aligned and in flow communication with each other so as to allow reactor coolant to flow from pump outlet manifold 70 into the upper chamber 54. Flow holes 78 are provided within tube 76 for this purpose. The size of flow holes 78 are relatively unimportant providing they do not significantly restrict the flow of reactor coolant therethrough. On the other hand, the size of orifice 62 is extremely important and is to be determined in accordance with the above given relationships. Tube 76 is spring loaded onto a face seal 80 by spring member 82. Rod 84 having a tapered end 86 extends from a position above shield plug 38 to within the opening through orifice 62. Rod 84 serves to varying the effective flow coefficient of orifice 62 by relative axial positioning of rod 84 with respect to orifice 62. Guides 88 attached to tube 76 may be provided along the length of tube 76 for the purpose of guiding the motion of rod 84. Rod 84 and tube 76 are made to be pressure tight by bellows 88 and 90 and seals 92 appropriately positioned as shown in the figure. Rod 84 is connected to a linear positioner which may be actuated by sensing devices (not shown) attached to the wall of the sump tank 34 of the pump 30. It will be readily apparent to those practicing this invention that the variable orifice depicted in FIG. 3 is merely one of many versions which may be utilized. Hence, it is not intended that the invention be limited to the illustrated variable orifice.

Figure 4:
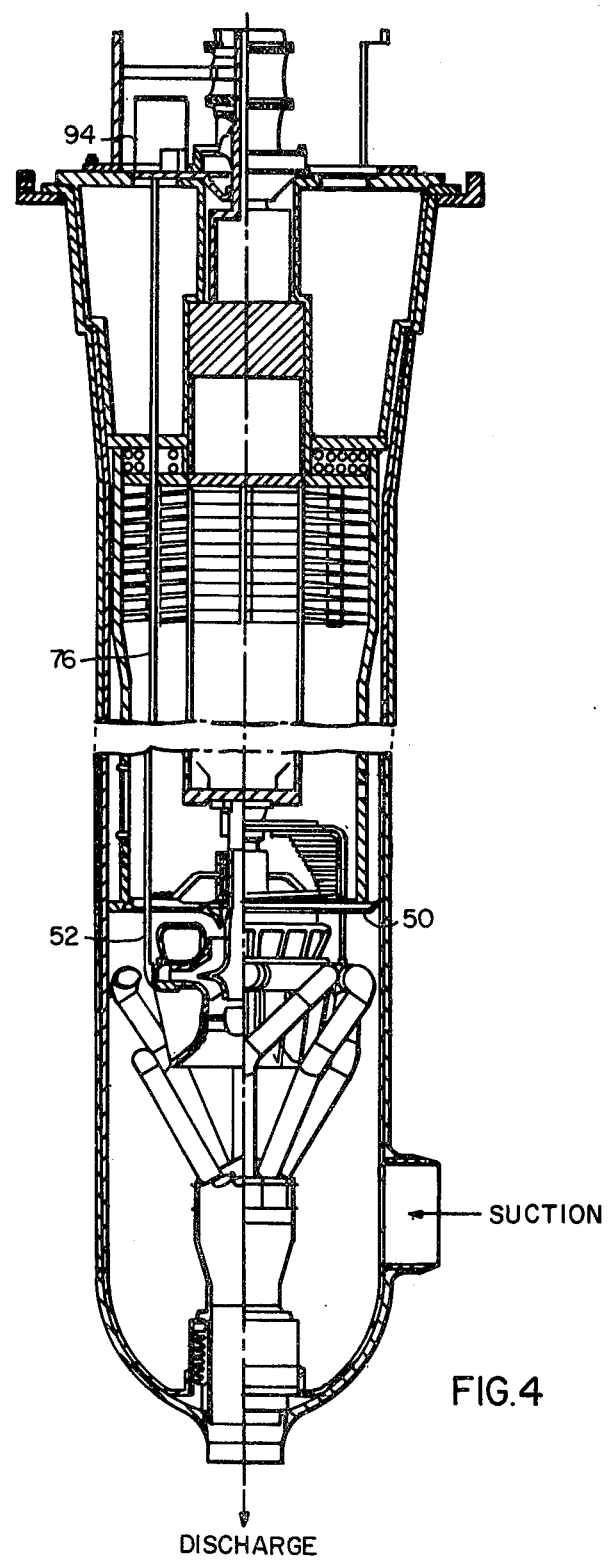

In FIG. 4, the variable orifice of FIG. 3 is shown in relation to the pump of FIG. 2. The relatively long length of tube 76 is shown therein. It may therefore be necessary to externally support tube 76 along its length by appropriate guide and support members (not shown).

From the foregoing description, taken in connection with the drawings it is seen that this invention provides apparatus to substantially maintain at a constant the level of liquid within a sump suction pump throughout all operating speeds of the pump; and the constant liquid level is maintained without the need to utilize multiple independently operated cover gas pressure systems in the primary systems of a liquid metal cooled nuclear reactor.

Since numerous changes may be made in the above-described apparatus and different embodiments of the invention may be made without departing from the spirit and scope thereof, it is intended that all the matter contained the foregoing description or shown in the accompanying drawings shall be interpreted as illustrative and not in a limiting sense.

I claim:

1. A liquid cooled nuclear reactor including a reactor vessel, said reactor vessel being partially filled with reactor coolant and having a cover gas above the level of reactor coolant in said reactor vessel, a heat exchanger connected to an outlet of said reactor vessel, a coolant circulating pump connecting an outlet of said heat exchanger to an inlet of said reactor vessel, said pump being of a type classified as a sump suction pump having an integral sump tank and including inlet and outlet nozzles attached to said sump tank, an impeller disposed within said sump tank, a flow manifold connecting said pump impeller to said pump outlet nozzle, a drive shaft extending within said sump tank and attached to said impeller therein, a divider plate immersed within said reactor coolant within said sump tank, said divider plate being located above said impeller and said pump inlet nozzle so as to divide said sump tank into an upper chamber and a lower chamber, and orifice means for maintaining said cover gas in the tank at a pressure substantially equal to the pressure of said cover gas in the reactor vessel during all speeds of pump operation, said orifice means comprising a flow restricting tube member connecting said manifold to said upper chamber, and said flow restricting tube being sized such that reactor coolant flow through said tube member from said flow manifold to said upper chamber substantially equals reactor coolant flow passed said divider plate from said upper chamber to said lower chamber whereby the reactor coolant level in said pump tank remains substantially constant for all speeds of operation of said pump.

2. The reactor of claim 1 wherein said flow restricting tube member of said pump includes a flow restriction having a fixed size.

3. The reactor of claim 1 wherein said orifice means of said pump comprises a variable flow restriction and includes said tube member, an annular disc fixedly connected to the internal diameter of said tube member, said disc having an opening therethrough of a predetermined size, and an elongated rod having a taper at one end thereof, the tapered end of said rod extending within said opening of the disc, said rod being mounted for movement with respect to said opening in the disc so as to further extend said tapered end of the rod within said opening or to withdraw said tapered end of the rod from said opening in the disc to vary the size of said opening through said disc.

4. The reactor of claim 3 including linear positioning means mounted external of said sump tank, a motor being included with said linear positioning means, spaced liquid level sensing devices mounted to said sump tank for operating said linear positioner, said elongated rod extending from within said annular disc to said linear positioning means, said elongated rod being operatively connected to said motor of the linear positioning means such that actuation of said motor by said liquid level sensing devices repositions the tapered end of said elongated rod within said opening of the annular disc.

* * * * *